United States Patent [19]

Giannuzzi

[11] Patent Number: 4,963,062

[45] Date of Patent: * Oct. 16, 1990

[54] SINGLE-PIECE, PRE-SHAPED ANCHOR

[76] Inventor: Louis N. Giannuzzi, 59 Dingletown Rd., Greenwich, Conn. 06830

[ * ] Notice: The portion of the term of this patent subsequent to May 9, 2006 has been disclaimed.

[21] Appl. No.: 305,077

[22] Filed: Feb. 2, 1989

Related U.S. Application Data

[63] Continuation-in-part of Ser. No. 643,392, Aug. 23, 1984, Pat. No. 4,828,445, which is a continuation-in-part of Ser. No. 388,256, Jun. 14, 1982, abandoned.

[51] Int. Cl.⁵ .................. F16B 13/06; F16B 15/08; F16B 15/00
[52] U.S. Cl. .................... 411/45; 411/451; 411/446; 403/408.1
[58] Field of Search .............. 411/21, 47, 41, 42, 411/45, 60, 69, 72, 73, 451, 456, 479, 485, 922, 903, 446, 44, 182; 403/405.1, 408.1; 405/259, 260

[56] References Cited

U.S. PATENT DOCUMENTS

| 116,990 | 7/1871 | Plumkett | 411/374 |
|---|---|---|---|
| 372,844 | 11/1887 | Emerson et al. | 411/491 |
| 1,466,676 | 9/1923 | Stronach et al. | 411/497 |
| 1,574,790 | 3/1926 | Carroll | 411/456 |
| 1,637,419 | 8/1927 | Klein | 411/922 |
| 1,798,468 | 3/1931 | Hartzler et al. | 411/456 |
| 1,821,400 | 1/1931 | Peirce | 411/21 |
| 2,256,401 | 9/1941 | Maze | 411/454 |
| 2,690,693 | 10/1954 | Campbell | 405/259 |
| 2,942,819 | 6/1960 | Brogan | 411/394 |
| 3,391,720 | 7/1968 | Morse | 411/259 |
| 3,494,244 | 2/1970 | Wayland | 411/510 |
| 3,495,494 | 2/1970 | Scott | 411/908 |
| 3,578,200 | 5/1971 | Hetzer | 411/910 |
| 3,791,750 | 2/1974 | Cameron | 411/452 |
| 3,895,773 | 7/1975 | Solo | 411/394 |
| 4,342,982 | 8/1982 | Plasko | 403/267 |
| 4,572,720 | 2/1986 | Rockenfeller et al. | 411/394 |
| 4,696,423 | 9/1987 | Ryan | 411/479 |

FOREIGN PATENT DOCUMENTS

| 210677 | 8/1960 | Austria | 411/306 |
|---|---|---|---|
| 279128 | 2/1970 | Austria | 411/446 |
| 3620372 | 1/1988 | Fed. Rep. of Germany | 411/47 |
| 2468024 | 5/1981 | France | 403/405 |
| 55-122918 | 9/1980 | Japan | 411/451 |
| 915732 | 7/1954 | United Kingdom | 411/456 |
| 2103748 | 2/1983 | United Kingdom | 411/431 |

Primary Examiner—Neill R. Wilson
Attorney, Agent, or Firm—Michael Ebert

[57] ABSTRACT

A one-piece, pre-shaped anchor adapted to be forcibly driven axially into a tightly-fitting hole so that the anchor makes a strong interference fit therein. The anchor is constituted by a drivable element and an elongated shank integral therewith. The shank is pre-shaped to have an end portion furthest from the element which extends in the direction of the longitudinal axis passing through the element and shank, and to have at least one undulation between the element and the end portion that creates a bend having a peak on one side of the shank between spaced apart base portions on the other side of the shank. The anchor is formed of resilient material, whereby when the shank is driven into the tightly-fitting hole, the undulation will then be forcibly altered by reaction with the wall of the hole, and in seeking to recover its originl shape, will secure the anchor in place.

25 Claims, 5 Drawing Sheets

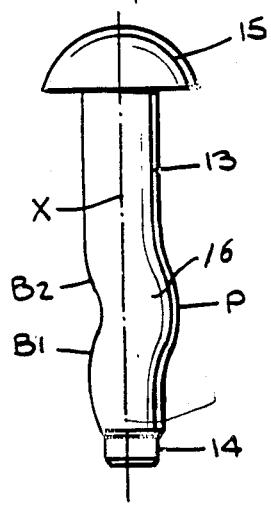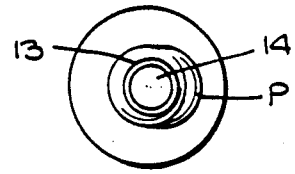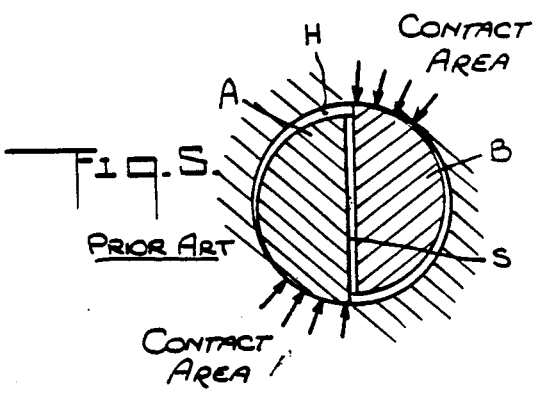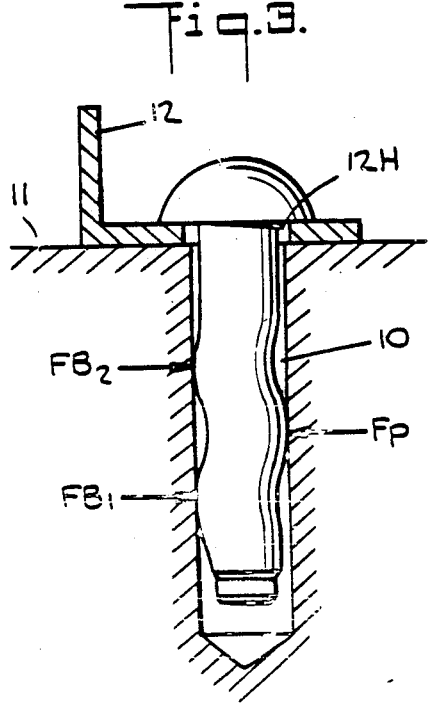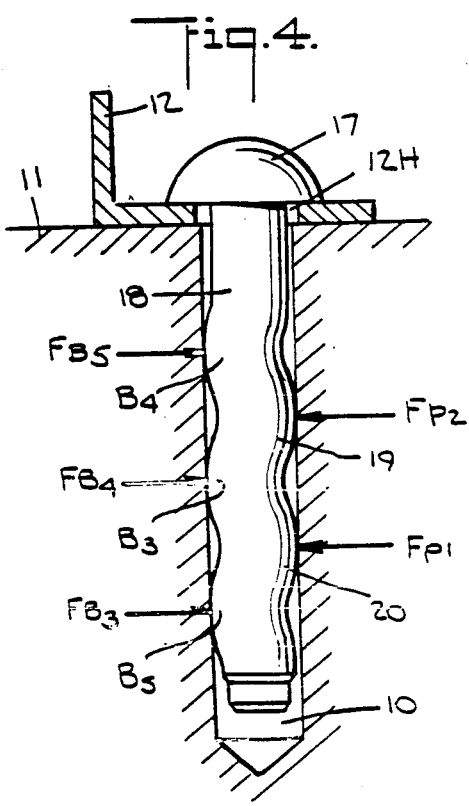

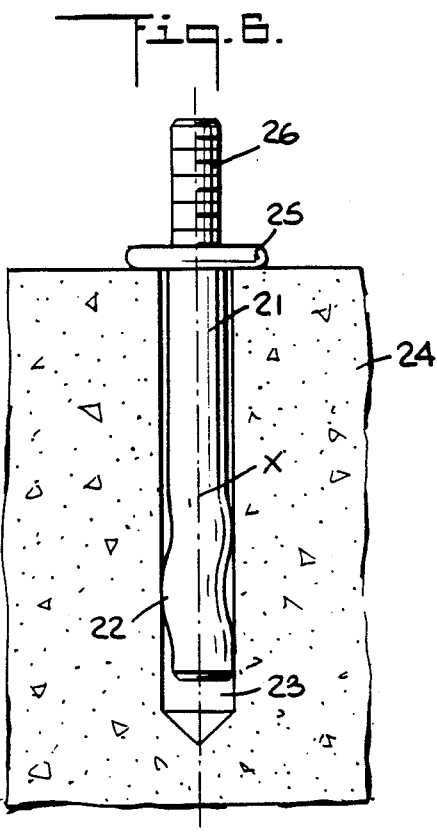
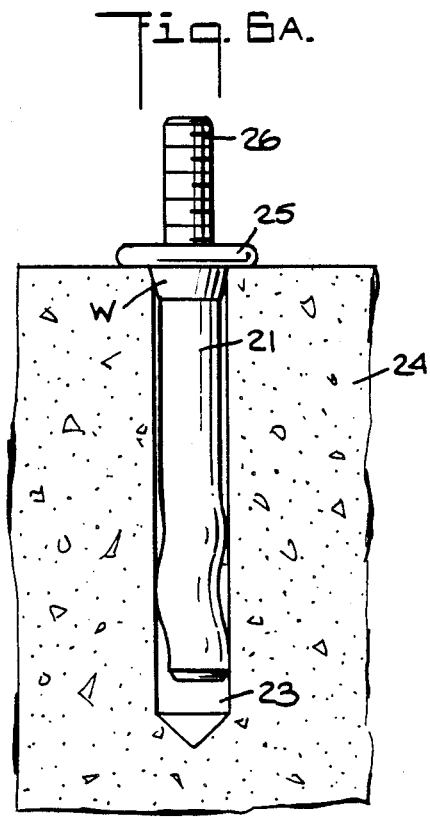
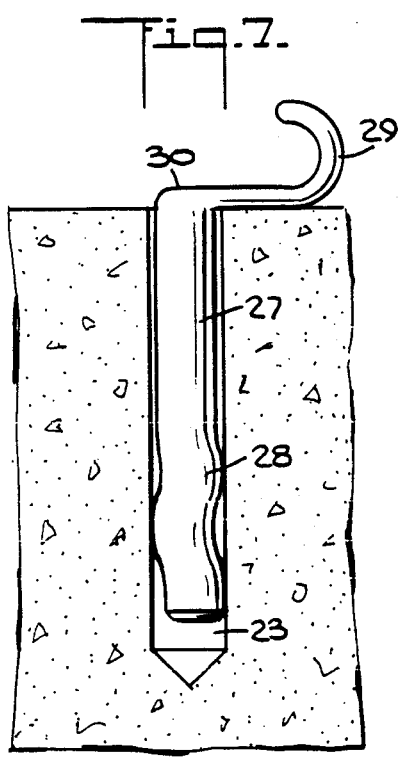
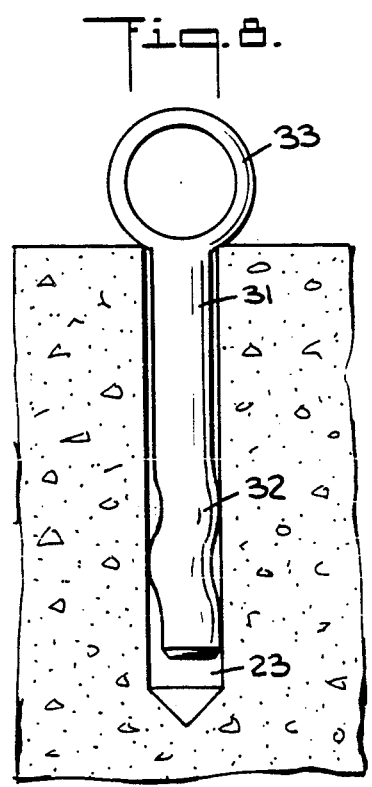

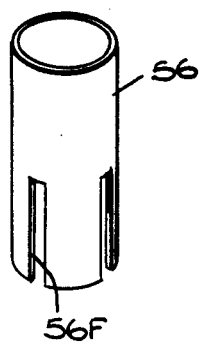
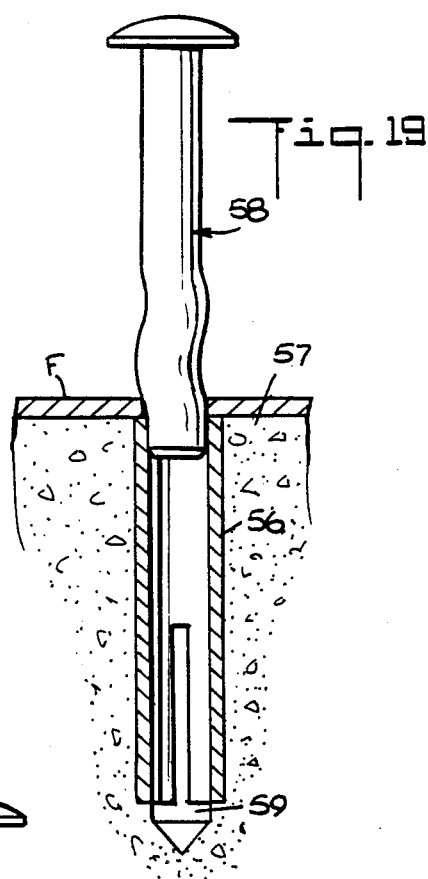
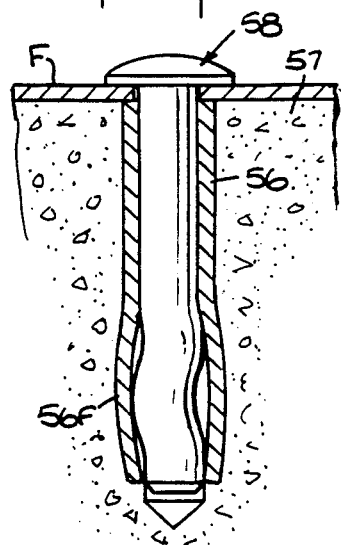
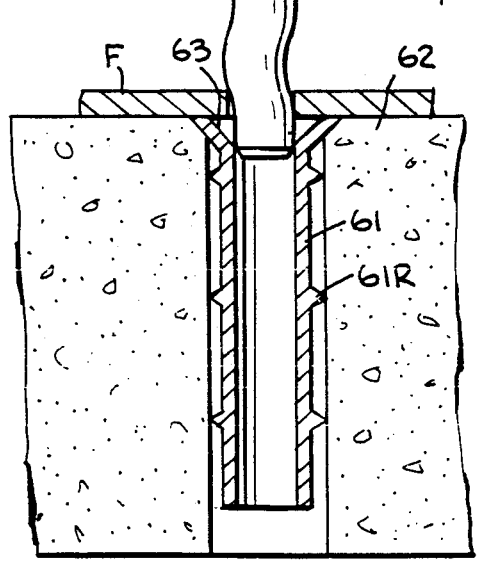
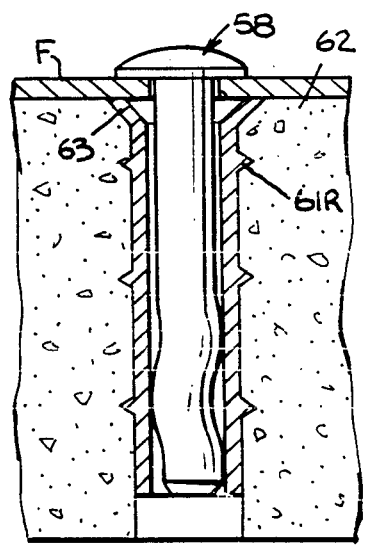

SINGLE-PIECE, PRE-SHAPED ANCHOR

RELATED APPLICATIONS

This application is a continuation-in-part of my co-pending application Ser. No. 643,392, filed Aug. 23, 1984, now U.S. Pat. No. 4,828,445 which in turn is a continuation-in-part of my parent application Ser. No. 388,256, filed June 14, 1982, now abandoned, the entire disclosures of which are incorporated herein by reference.

BACKGROUND OF INVENTION

1. Field of Invention

This invention relates generally to anchors for securing fixtures, sheathing or other parts to the surface of masonry or other structural material, and more particularly to a one-piece, pre-shaped anchor which when forcibly driven into a hole becomes securely lodged therein.

2. Prior Art

It is frequently necessary to secure fixtures or other parts against the surface of masonry. The term "masonry" as used herein encompasses not only brickwork and concrete but all rigid, non-metallic structural materials such as stone and plaster. The need for effective anchors also exists in the context of structural materials which do not qualify as masonry, such as wood, metal or plastic substrates against whose surface parts such as fixtures or sheathing must be attached. While the invention will be described and illustrated mainly in connection with masonry, it is to be understood that the anchors are not limited to this application and are useful in many other structural applications.

The conventional practice in the context of masonry is to make use of an anchor bolt assembly which includes an expansible shell that is caused to expand when the bolt is turned by a wrench or other torque-producing tool, the expanded shell gripping the wall of the hole to securely retain the bolt therein.

Typical of such anchor bolt assemblies is the type disclosed in the Giannuzzi patent 3,766,819 in which a cone at the rear of the bolt is caused to advance toward an expansible shell encircling the bolt when the bolt is rotated, the expanded shell acting to anchor the bolt in the hole. Anchor bolt assemblies operating in a similar manner are disclosed in the patent to McIntyre, 4,056,037 and the Dempsey patent 2,988,950.

Quite apart from the fact that conventional anchor bolt assemblies are composed of two or more cooperating components and are relatively expensive to manufacture, are the difficulties often experienced in making installations with such assemblies.

On a major construction site, it is generally necessary to use literally hundreds or thousands of anchor bolts to secure such items as suspended ceilings, soffits and wall studding, or to make similar attachments requiring repetitive anchor bolt operations. In each of these, the bolt must be installed in a carefully drilled hole. The bolt must be properly inserted in the hole and then turned by a tool until the bolt is locked in the hole by its associated expansible shell. This requires a significant degree of care by the installer. A large number of anchor failures arise from unqualified installers who fail to drill an accurate hole or to adequately torque the anchor. Moreover, there is no way of knowing whether the anchor is not holding properly until it fails in service, and this may have tragic consequences.

Apart from the problem of improper installation is the fact that with existing anchor bolts, the installation of each bolt is a time-consuming operation. Since at a given site, this operation must be repeated over and over again, the operator int he course of a working day is only able to install a limited number of anchor bolts. This adds substantially to construction site labor costs.

In order to reduce the time involved in installing anchor bolts, anchors have been proposed which are driven into pre-drilled masonry holes, thereby obviating the need to turn in the anchor bolt to expand a wedging shell. Thus the patent to Nillson, 3,894,469, discloses a nail-like anchor which when hammered into a hole has a weakened portion that is deformed by this action to effect the desired wedging.

The Gutshall patent 3,518,915 also shows a one-piece expandable anchor. Other patents, such as Patruch, 3,022,701, show two-piece driven anchors in which a nail-like element is hammered into an expansion sleeve. In these prior arrangements, the anchor bolt assembly still depends on an expansion element or equivalent means that is formed outwardly against the wall of the hole by the hammering action.

Also of prior art interest is the single piece anchor marketed under the trademark "Rawl Drive" by the Rawlplug Company, Inc., of New Rochelle, NY. This anchor has a resilient shank, an intermediate section of which is split into two half sections having a semi-circular cross section. These are expanded in opposite directions in the plane of the split. The unsplit diameter of the shank is significantly smaller than the diameter of the masonry hole in which the anchor is to be installed, whereas the maximum diameter of the split section is somewhat greater than that of the hole.

In making a "Rawl Drive" anchor, one starts with an annealed piece of steel which is first cold headed into a simple rivet-like shape. In order to then split the intermediate section of the shank into two half sections and to expand these half sections in opposite directions in the plane of the split to create the desired bulge, one must heat treat the anchor to impart thereto sufficient hardness to react to the splitting tool; for otherwise, the then ductile metal will yield and will not split. After completion of the splitting and expansion operation, the anchor must again be heat treated to a spring-like temper to render the expanded split section resilient and compressible. Because of this relatively complex procedure, the "Rawl Drive" anchor is quite expensive to make.

When the "Rawl Drive" anchor is driven into a hole drilled in masonry, the expanded half sections thereof are compressed inwardly and straightened out. But because of the resilient of the half-sections, they seek to resume their normal expanded shape, thereby imposing an anchoring force on the wall of the masonry hole on opposite sides thereof. The remainder of the shank imposes no anchoring force on the drilled hole; hence whether the anchor is long or short, there is no substantial difference in the anchoring force.

Being axially split and expanded, the half sections of the shank only make contact with the surface of the hole in a region adjacent to the plane of the split. This provides mating contact of approximately 45 degrees on each split half, and the resultant holding power is low.

A serious drawback of the "Rawl Drive" anchor is that the bulge created by the split and expanded half sections has a maximum transverse dimension which is necessarily significantly greater than the diameter of the hole drilled in the masonry, and consequently is greater than the diameter of the mounting hole in the fixture to be attached to the masonry wall by the anchor bolt. Because a "Rawl Drive" anchor, before entering the masonry hole, must first pass through the mounting hole in the metal fixture, the use of conventional fixtures in conjunction with "Rawl Drive" anchors is precluded. That is to say, one cannot use the "Rawl Drive" anchor with a fixture whose mounting hole has a diameter which corresponds to that of the drilled hole, which is usually the case, for the Rawl Drive anchor cannot go through this mounting hole. Moreover, because of the bulge therein, when the Rawl Drive anchor is driven into a hole driven in masonry, it may score and mutilate this hole and thereby weaken the holding power of the anchor.

The problems encountered with an anchor of the "Rawl Drive" type are also experienced with an anchor of the type disclosed in the Japanese patent to Katou, 55-122918, which discloses a single piece anchor of solid metal whose shank has at least one offset section therein whose dimension exceeds that of the drilled hole into which the anchor is to be driven.

Also of background interest is the German patent to Becker, 915,730, which discloses a corrugated pin that is inserted into a hole drilled in plastic material and has a diameter much smaller than that of the hole, the remaining space in the hole being filled with a resinous material that is bonded to the wall of the hole to complete the anchor.

In my above-identified related patent applications, there is disclosed a one-piece, pre-shaped anchor adapted to be forcibly driven axially into a tightly fitting hole so that the anchor makes a strong interference fit therein.

This anchor is constituted by a drivable head and an elongated shank integral therewith, the shank being pre-shaped to have an end portion furthest from the head which extends in the direction of the longitudinal axis passing through the head and the shank, and to have at least one undulation between the head and the end portion that creates a bend having a peak on one side of the shank between spaced apart base portions on the other side of the shank. The anchor is formed of resilient solid metal such as steel, whereby when the shank is driven into the tightly fitting hole, the undulation will then be forcibly deformed by reaction with the wall of the hole, and in seeking to recover its original shape will secure the anchor in place.

In this anchor, the maximum cross-sectional dimension of the shank is not substantially greater than the diameter of the hole; hence when it is driven into the drilled hole, it will not score, chisel or otherwise mutilate the hole and thereby impair the holding power of the anchor. Moreover, because the mounting hole in the fixture or other part to be secured to the surface of the masonry or substrate has a diameter that substantially matches that of the drilled hole, the shank of the anchor will snake its way through the mounting hole.

A solid metal anchor of the type disclosed in my related patent application is relatively expensive; for when this anchor is made of steel, the cost thereof depends on the cost per pound of the steel stock from which it is fabricated, and this cost is not low. Also, since the cost of heat treating the steel anchor to render it resilient depends on the poundage of steel and the cost of plating and of shipping the anchor also depends on the steel poundage, these factors add to the ultimate cost of the solid steel anchor.

Another problem encountered with anchors of the type disclosed in my related patent applications is that it may not be effective in light weight concrete. In weak, porous or brittle masonry, this anchor, when its shank is driven into a hole drilled in such masonry, will not enter the hole without chiseling the hole to accommodate the bend in the shank. As a consequence, the installed anchor will lack adequate holding power.

SUMMARY OF INVENTION

In view of the foregoing, the main object of this invention is to provide a one-piece, pre-shaped anchor which when hammered or otherwise forcibly inserted axially into a hole drilled in masonry or other structural material is securely lodged therein.

More particularly, an object of this invention is to provide anchors of the above type with heads in various configurations, such as a head in a stud or hook form.

Among the significant advantages of an anchor in accordance with the invention are (a) ease of insertion to facilitate high-speed installations, (b) an assured multi-level gripping action when the anchor is fully inserted in the hole, (c) a tight attachment of the fixture or other part held against the masonry surface, (d) a high level of holding power due to relatively large contact surface areas, (e) an ability to snake through the mounting hole of a fixture whose diameter corresponds to that of the hole drilled in masonry, and in the case of anchors formed of tubular material (f) a substantial reduction in the cost of the anchor by reason of its tubular construction.

Also an object of the invention is to provide a low-cost, pre-shaped hollow anchor which requires no more skill to install than it takes to drive in a nail with a hammer, thereby minimizing the possibility of a faulty installation.

Still another object of this invention is to provide a single-piece, pre-shaped hollow anchor which may be fabricated of metal or synthetic plastic material in tubular form and is capable of supporting relatively heavy loads against the masonry surface.

A significant feature of a hollow anchor in accordance with the invention is that it may be covered by a decorative press-in cap.

Yet another object of the invention is to provide an expansible sleeve usable in conjunction with a single-piece anchor whose resilient shank has a bend therein, the sleeve being received in a hole drilled in a relatively weak substrate to form a wall liner therefor, whereby when the shank is driven into the lined hole, the bend does not chisel the hole but serves to expand the liner to impress it into the hole wall.

Briefly stated, these objects are attained in a one-piece, pre-shaped anchor adapted to be forcibly driven axially into a tightly fitting hole so that the anchor makes a strong interference fit therein. The anchor is constituted by a drivable element and an elongated shank integral therewith. The shank is pre-shaped to have an end portion furthest from the head which extends in the direction of the longitudinal axis passing through the element and shank, and to have at least one undulation between the element and the end portion that creates a bend having a peak on one side of the shank between spaced apart base portions on the other side of the shank.

The anchor is formed of tubular material which is resilient, whereby when the shank is driven into the tightly fitting hole, the undulation will then be forcibly altered by reaction with the wall of the hole, and in seeking to recover its original shape, will secure the anchor in place. The maximum cross-sectional dimension of the shank is not substantially greater than the diameter of the hole, whereby when the shank is driven therein, it will not chisel or otherwise mutilate the hole wall.

BRIEF DESCRIPTION OF THE DRAWINGS

For a better understanding of the invention as well as other objects and further features thereof, reference is made to the following detailed description to be read in conjunction with the accompanying drawings, wherein:

FIG. 1 is an elevational view of a first embodiment of a single-piece, pre-shaped single bend anchor in accordance with the invention;

FIG. 2 is a bottom view of the anchor;

FIG. 3 illustrates the anchor after it is driven into a hole drilled in masonry to attach a fixture against the masonry surface;

FIG. 4 is an elevational view of a second embodiment of a single-piece, pre-shaped, double-bend anchor in accordance with the invention after it is driven into a hole drilled in masonry;

FIG. 5 illustrates the areas of contact in a split anchor of the prior art type;

FIG. 6 illustrates a third embodiment of a single-piece anchor driven into a hole, this anchor having a stud end;

FIG. 6A illustrates a modification of the third embodiment;

FIG. 7 illustrates a fourth embodiment of a single-piece anchor driven into a hole, this anchor having a hanger end;

FIG. 8 illustrates a fifth embodiment of an anchor, this anchor having an eye-shaped end;

FIG. 18 is a perspective view of a slotted sleeve adapted to line the wall of a hole drilled in masonry to receive a single-piece anchor having a bend therein;

FIG. 19 shows the sleeve inserted in the drilled hole, with the anchor shank about to enter the sleeve;

FIG. 20 shows the anchor shank when fully driven into the sleeve;

FIG. 21 shows a sleeve having rings thereon, with the shank of an anchor driven into the sleeve; and FIG. 22 shows a sleeve with a flared collar.

DESCRIPTION OF INVENTION

First Embodiment

Figure 9:
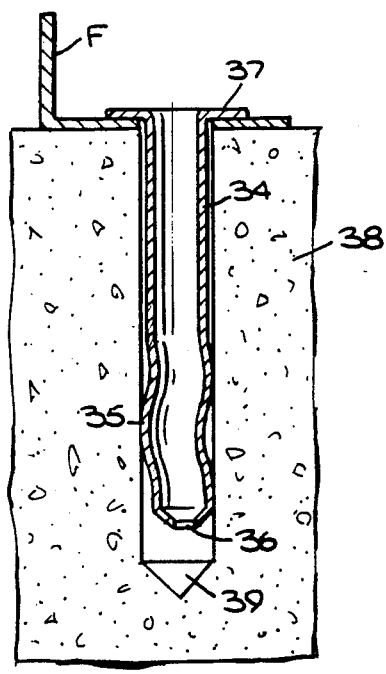
FIG. 9 illustrates a sixth embodiment of an anchor in accordance with the invention installed in a masonry hole, the anchor being formed of tubular material.

Referring now to FIGS. 1 to 3, there is shown a one-piece, pre-shaped anchor in accordance with the invention for insertion in a hole 10 drilled in masonry 11, the anchor serving to attach a fixture 12 against the surface of the masonry, the fixture having a mounting hole 12H.

The anchor is constituted by a shank 13 fabricated of carbon or stainless steel or other material having a circular cross section whose diameter is constant throughout the length of the shank, the tip 14 of the shank being of reduced diameter and chamfered to facilitate insertion in hole 10. The diameter of hole 10 is equal to or slightly larger than the shank diameter. The upper end of shank 13 is integral with a rounded head 15.

Shank 13 is pre-shaped to create an undulation therein which deviates from the longitudinal axis X passing through the center of head 15 to create a curved bend 16 which is offset with respect to this axis. After the bend is formed, the shank is rendered resilient by tempering the metal at an appropriate temperature to impart a memory thereto, such that when the shank is thereafter forcibly deformed, it seeks to recover its original shape.

When, therefore, the anchor is driven by a hammer or other means adapted to strike head 15, shank 13, as it advances axially into masonry hole 10, forces bend 16 to straighten out, as shown in FIG. 3, in order to gain entry thereto. This forcible deformation of bend 16 causes the bend to exert outward pressures against the wall of hole 10 at different levels therein as it seeks to recover its original shape. These lateral pressures offer a considerable resistance to axial withdrawal of the shank from the hole.

Hence the anchor, despite its simplicity and the absence of an expansible shell as in prior art anchors, is capable of supporting substantial loads on a masonry wall or on the surface of any other material. The holding capacity depends, of course, on the dimensions and configurations of the bolt and the nature of its metal. In practice, anchors of the type may be designed for supporting loads as heavy as 2000 lbs. or greater.

In order to appreciate the fact that the pressures exerted against the wall of the hole are imposed at different levels, the nature of bend 16 must be further analyzed. Bend 16 has a peak P on one side of the shank. As shown in FIG. 1, peak P represents the point of maximum offset from the longitudinal axis X of the shank this point being well outside the periphery of the drilled, non-tapped hole for which the anchor is intended.

The bend also has a lower base $B_1$ on the other side of the shank which is at a level below peak P, and an upper base $B_2$ which is at a level above peak P. When, therefore, as shown in FIG. 3, the shank is driven into hole 10 to more or less straighten out the bend, the resilient bend, because it seeks to recover its original shape, exerts a first holding force $F_p$ at a level where its peak presses against the corresponding side of the wall of the hole, a second holding force $F_{B1}$ at a lower level where base $B_1$ of the bend presses against the opposite side of the hole, and a third holding force $F_{B2}$ at a higher level where the base $B_2$ of the bend presses against the opposite side of the wall of the hole.

Hence the holding forces are not concentrated at one level as in prior art anchors, but are distributed along the length of the hole to develop a far greater holding power. This distinction in the context of modern masonry materials is of signal importance.

Concrete in use 20 years ago had a compressive strength of about 2000 psi, whereas concretes of the type now in use range in compressive strength from 4000 to 10,000 psi. With increased compressive strength of the concrete, the surface of the untapped hole drilled therein becomes smoother and harder. Since the single-piece anchor makes surface contact with the drilled hole, the greater the amount of surface contact, the greater the holding power of the anchor. An anchor in accordance with the invention, as will be later explained, achieves almost 180 degrees surface surface contact at a minimum of three levels.

The invention is not limited to the use of high strength resilient metals, for it is applicable to any material inherently having a high degree of memory and capable of being shaped without rupturing the material or altering its spring-like properties. Thus, use may be made of nylon or polyolefin materials which are moldable in a single step operation to create both the head and shaped shank of the anchor.

While in the anchor shown in FIGS. 1 and 3, the shank is round and of uniform diameter, the shank may be tapered to facilitate insertion, but in that case the largest diameter of the shank must be substantially equal to that of the masonry hole. The degree of bend represents in a sense a compromise between that value providing the highest masonry holding power and that value which makes it reasonably easy using ordinary tools, to drive the anchor bolt in the hole. However, where a wall anchor is intended for use with a pneumatic or other high power mechanized driver, a greater degree of bend may be provided within the limits imposed by the nature of the metal.

Bolt Parameters

In a pre-shaped wall anchor in accordance with the invention, the shank may, as in FIG. 1, have a constant diameter through its length that is lightly less than that of the pre-drilled masonry hole; or its diameter may be slightly larger, in which case the tip must be relieved to facilitate entry. Where the shank diameter is slightly larger than that of the masonry hole, a greater force is required to drive it in, the masonry hole then slightly giving way to permit insertion.

Also, in practice, the shank of the anchor may have a stepped formation, the diameter being reduced a short distance at the tip section to facilitate entry into the masonry hole, the shank diameter then increasing abruptly to a size about that of the hole. Or the shank diameter may vary from end to end. Thus the shank may taper from tip to head, or taper from tip to the midpoint of the shank and then reversely taper from this point to the head. And the cross section of the shank need not be circular but assume other geometric forms.

The shank undulations may be singular or multiple; then may be formed in one plane or in different planes with respect to each other; or the undulations may be created by a spiral formation of the shank. But whatever their form, the shape and magnitude of the undulations must be such that at all times, the head of the anchor maintains a proper relationship with the center line of the hole, this being perpendicular to the face of the masonry. In this way, the horizontal and vertical force vectors which develop from the blow struck on the head of the anchor are so proportioned that the anchor will always be displaced axially into the hole and will not cause the anchor to bend at an angle to the center line and possibly break off. Improper shaping will cause the anchor head portion to lean away from the desired orientation.

The shank undulations must be such that they will not scrape and scavenge the walls of the drilled hole; for if this occurs, the entering anchor will chisel its own shape into the originally round hole. As a consequence, the reshaped hole will no longer compel the undulations to straighten out as the shank enters the hole, the memory of the shank is then not actuated and the holding power remains undeveloped. In short, the cross section dimensions of the shank play an important role as the effectiveness of the anchor, for an excessive size will render it impossible to drive the anchor in the hole, and improper sizing may cause chiseling of the hole and impair the operation of the anchor or reduce its holding power.

The shape of the anchor crown or head is preferably convex and free of angular edges s that those hammer blows which are not perfectly in line with the center line of the anchor will not bend or break off the head portion thereof.

It is also important to note that the bulge created by the undulation or undulations in the shank is offset with respect to the longitudinal axis X and is not symmetrical thereto, as in the "Rawl Drive" anchor. Hence the shank can snake its way through the mounting hole in the fixture and not, as in the case of a symmetrical bulge, have to be forced through this hole and thereby mutilate the hole. Normally, the mounting hole of the fixture has a diameter about the same as the masonry hole, and the shank of the present anchor has about the same diameter. The fact that the shank is undulating does not prevent its admission into the holes. But with the Rawl Drive anchor, the expanded bulge has a maximum diameter significantly greater than the masonry hole diameter, which creates a problem in getting this bulge through the fixture hole.

In order to appreciate why thet contact area with the drilled hole is much greater than that obtainable with a "Rawl Drive" anchor, reference is made to FIG. 5. This shows a hole H drilled in masonry into which has been inserted a Rawl Drive anchor, an intermediate section of which is split at plane S to create two half sections A and B. These are expanded in opposite directions in the plane of the spit to create a bulge causing the resilient half section A to press against the surface of the hole in a contact area A' on one side of the hole and causing the other half section B to press against the hole surface in a contact area B' on the opposite side of the hole.

These points of contact are adjacent the split and nowhere else. Each half section therefore has the ability to achieve only about 45 degrees of contact with the hole surface. Half sections A and B together make contact with about 90 degrees or only one quarter of the inner surface of the hole.

The reason why it is not possible in the Rawl Drive anchor to increase the diameter of the shank to bring about a larger contact area is that then then anchor would not work. If the shank diameter were as large as the hole diameter, the two split halves of the anchor would press against the mating surface of each other, and this would resist the ability of the two halves to move. To function as a spring, the half sections must be free to move in opposite directions as they seek to regain their original expanded shape.

In the present single piece anchor, the shank has a diameter which is about equal to that of the drilled hole. Therefore, when the undulated shank is driven into the hole, it straightens out and establishes surface contact at the bend and at the bases thereof on opposite sides of the anchor establishing approximately 160 degrees of contact area at each contact. Since 160 degree contact is established in the case of a single bend anchor at three contact areas and at three different levels, it has, therefore, 480 degrees of surface contact as compared to 90 degrees for the Rawl Drive anchor. With a double bend anchor an even greater surface contact is established.

Second Embodiment

In the embodiment of the anchor shown in FIG. 4, the anchor, which has a head 17 and a shank 18 which are essentially the same as those in FIG. 1 and is made in the same way, except that instead of a single undulation to create a single offset bend, shank 18 has two curved bends 19 and 20 in series. Because bend 19 flows into bend 20, the two bends share a common junction base $B_3$, bend 19 having an upper base $B_4$ and bend 20 having a lower base $B_5$.

In this double-bend wall anchor, the forces exerted by the shank on the wall of the drilled untapped hole in the masonry 11 are distributed in five distinct levels along the depth of the hole. Thus, there is a base force $F_{B3}$ at the lowest level, a peak for $F_{P1}$ at a higher level, a base force $F_{B4}$ at a still higher level, a peak force $F_{P2}$ at the level thereabove, and a base force $F_{B5}$ at the highest level. The base forces are in one side of the hole, and the peak forces are in the opposite side. These forces act in combination to provide a very high power anchor.

Third Embodiment

In the first and second embodiments of the invention, the heads of the single-piece anchor are similar to conventional bolt heads so that the anchors may readily be driven into a hole drilled in masonry or otherwise formed in a substrate or solid body. When the anchor is used to hold a fixture or other part against a masonry wall, the underside of the head of the installed anchor abuts the outer surface of the fixture.

In some instances it may be desirable to provide, instead of a head on the anchor, an externally-threaded stud so that a fixture or other part having a mounting hole can be secured to the surface of the masonry, with the stud projecting through the mounting hole and a nut being received on the stud to hold the part in place. The advantage of this stud arrangement is that it is then possible, should the need arise, to remove the part from the masonry by simply turning out the nut holding the part in place. This cannot be done when the anchor has a bolt head; for once the anchor is driven into the hole, it cannot readily be removed.

A single piece anchor in accordance with the invention having a stud end is shown in FIG. 6, where it will be seen that the anchor has a resilient shank 21 provided with a bend 22 therein which when driven into a hole 23 drilled in masonry 24 is deformed to provide the necessary holding power.

The upper end of shank 21 is provided with a circular flange 25 which rests against the surface of the masonry, above which is an externally threaded stud 26. The longitudinal axis X extends through the stud and the shank, bend 22 being offset with respect to this axis.

Security Element

In many instances, when an anchor in accordance with the invention is installed in masonry or other structural material to secure a fixture or other part to the surface of the material, it may be subjected to lateral vibratory forces of high strength. And despite the holding power of the anchor, these lateral vibratory forces may cause the anchor to loosen and become ineffective.

The reason such loosening may occur is that when the diameter of the shank is slightly smaller than that of the hole into which it is inserted, this permits some degree of play in the space between the anchor shank and the wall of the hole. As a consequence, lateral vibratory forces imposed on the anchor will cause the shank to wiggle, and this action will in time cause the anchor to loosen.

To insure that such wiggling cannot take place in an anchor of the type shown in FIG. 6A, there is formed at the junction of shank 21 and flange 25, a security element W whose dimensions are such as to cause the element to at least fill the space in the mouth of a hole 23 so that the shank is then not free to wiggle when subjected to lateral vibratory forces.

In a preferred embodiment, security element W is given a diameter somewhat greater than that of the hole into which the shank of the anchor is driven. As a result, security element W not only fills the mouth of the hole but it is caused to jam and wedge therein when the shank is driven into the hole. In this embodiment, security element W may be given a slight taper to facilitate its forced entry into the mouth of the hole.

The shank itself has a maximum cross-sectional dimension no greater or only slightly greater than the diameter of the hole; hence it can be driven therein without difficulty, in the course of which the resilient bend in the shank is deformed or altered to impose a holding force on the wall of the hole. However, in the final phase of this drive, the mouth of the hole encounters security element W. If this element is dimensioned to fit snugly into the mouth of the hole and thereby fill it, it will enter the mouth without difficulty. If, however, security element W has a somewhat larger diameter than that of the hole, then in the final phase of drive, a greater driving force is required to jam and wedge element W into the mouth of the hole, thereby affording a still greater degree of security against loosening of the anchor as a result of lateral vibratory forces.

While FIG. 6A illustrates a stud-type anchor of the type shown in FIG. 6 which includes a security element, a similar element may be incorporated in all other embodiments of a single-piece anchor according to the invention. In all cases, the security element is formed at the junction of the shank and the drivable head or whatever other drivable element is provided in the anchor. In practice, security element W may be in cylindrical form with fluting, ribs or fins on the outer surface thereof adapted to bite into the wall of the hole mouth to resist wiggling of the shank.

Fourth Embodiment

In some cases, it may be desirable to hang a fixture or other object on the surface of the masonry rather than to secure it thereto by means of an anchor head as in the first and second embodiments or by means of an end stud as in the third embodiment.

To this end, as shown in FIG. 7, an anchor having a resilient shank 27 provided with a bend 28 has a hook 29 integral with the upper end of the shank. The junction of the hook and shank is in the form of a shoulder 30 which is engageable by a hammer head or other tool to drive the shank into masonry hole 23. With an installed anchor of this type, it is a simple matter to suspend a part from hook 29, or to remove the part from the hook.

Fifth Embodiment

In some cases, it is necessary to hitch electrical power and other lines along the surface of masonry.

An anchor adapted to function as a line hitch is shown in FIG. 8, where it will be seen that the upper end of shank 31 which has a bend 32 therein terminates in a ring-shaped eye 33 which is dimensioned to accommodate the line to be hitched.

Sixth Embodiment

FIGS. 9 to 12 show a single-piece, pre-shaped anchor in accordance with the invention whose main difference from the anchors previously shown and described is that the anchor in this instance is fabricated, not from solid metal, but from tubular material. For this purpose, use may be made of hollow steel tubing, or the tube can be created from stamped sheet metal that after being bent into tubular form is then heat treated to render it resilient.

Figure 10:
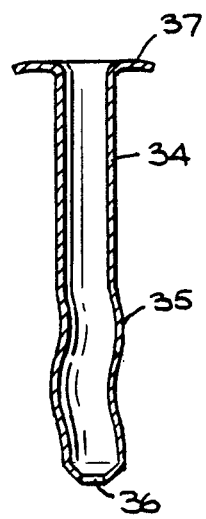
FIG. 10 is a separate view of the tubular anchor shown in FIG. 9.

The version of the hollow anchor shown in FIGS. 9 and 10 is formed from a tube of steel or any other suitable material whose shank 34 is provided with a bend 35, the lower end 36 of the shank being open. The upper end of the shank is outwardly flared to form a flange 37 which rests against the upper face of a fixture F or other part to be attached to the surface of masonry 38 when the shank is driven into a hole 39 drilled therein.

After the bend is formed in the hollow metal shank, the metal is tempered at a temperature appropriate thereto to impart a memory to the bend, such that when the bend is thereafter forcibly deformed, it seeks to recover its original shape.

As pointed out previously, the cost of producing and shipping a single piece metal anchor in accordance with the invention depends on the poundage of the anchor. It will now be explained why a hollow anchor formed of a metal tube is substantially stronger than an anchor of the same weight made of solid metal.

A hollow anchor in accordance with the invention may be treated as a cylindrical beam or column whose ability to withstand loading depends not only on the inherent strength of the anchor material but also on its cross section properties.

The cross section properties which determine the strength of a hollow cylindrical section (see Standard Handbook for Mechanical Engineers—Baumeister and Marks—7th Ed.—Section 5—3 showing a column in cross section) are the moment of inertia, the section modulus, and the radius of gyration. This radius of gyration is a function of the internal radius of the hollow column (r) and its external radius (R). The radius of gyration is equal to:

$$\sqrt{\frac{R^2 + r^2}{2}}$$

In Kent's Mechanical Engineer's Handbook, 12th Ed. (Section 8—26), under "General Principles in Design" for steel columns, it is pointed out that "the material should be distributed as far as possible from the center line in order to increase the radius of gyration."

Thus in a solid column the material is concentrated about the center line, whereas in a hollow column the same amount of material is distributed well away from the center line, thereby resulting in a far greater radius of gyration and a much stronger column.

Not only is a much greater holding power per pound of metal achieved, but in addition to reducing the material cost of the anchor it also cuts down the cost of heat treating and plating the anchor, for these functions are charged out on a per pound basis. Also, the relatively light weight anchors reduce shipping costs which are also on a per pound basis.

Figure 11:
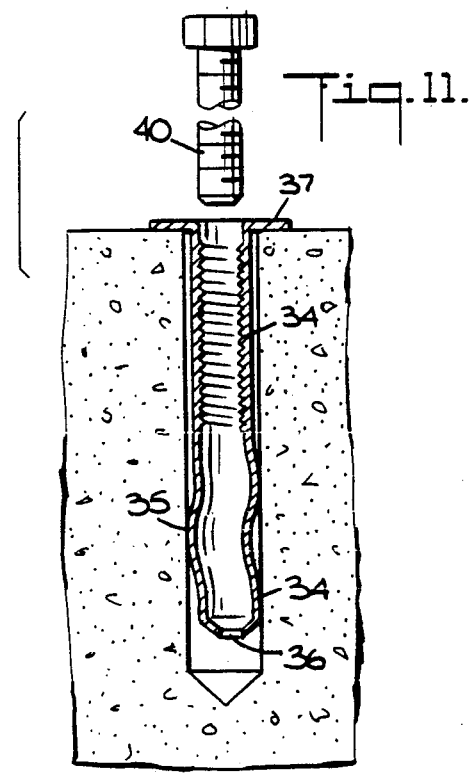
FIG. 11 shows the same tubular anchor as in FIG. 10, except that it is internally threaded.

In the version of the hollow, single-piece anchor shown in FIG. 11, the upper portion 34' of shank 34, which is of uniform diameter, is internally threaded so that a machine screw 40 can be threadably received thereon after the shank is hammered into a masonry or other hole.

It is known to cast a threaded stud into concrete when it is being poured so that the stud becomes anchored in the body of the concrete and can be used as a mounting stud to support fixtures. But this stud is permanently in place, and should one decide to remove the part secured to the concrete wall by the stud, one is still left with an unsightly and possibly hazardous stud.

The anchor shown in FIG. 11 affords removability; for if a fixture or other part is secured to the masonry surface by a machine screw 40 received in the internally threaded hollow anchor, and if it is later decided to remove this part and effectively erase the anchor, this can be done by unscrewing the machine screw from the hollow anchor and then pulling the anchor out of the wall and plastering the hole that remains, or leaving the anchor in place in the hole and plastering over it.

Figure 12:
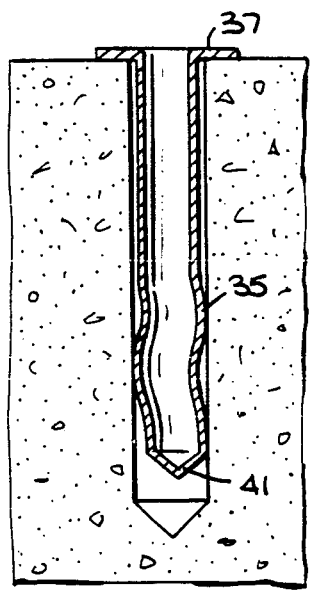
FIG. 12 shows the same tubular anchor shown in FIG. 1, except that its tip is closed.

In some instances, it may be desirable to provide, as shown in FIG. 12, a hollow anchor which is identical to that shown in FIG. 10 but whose tip 41 is closed rather than open. This is useful should one wish to fill the hollow anchor after it is installed in a hole with an epoxy compound to seal or rigidify the anchor.

Figure 13:
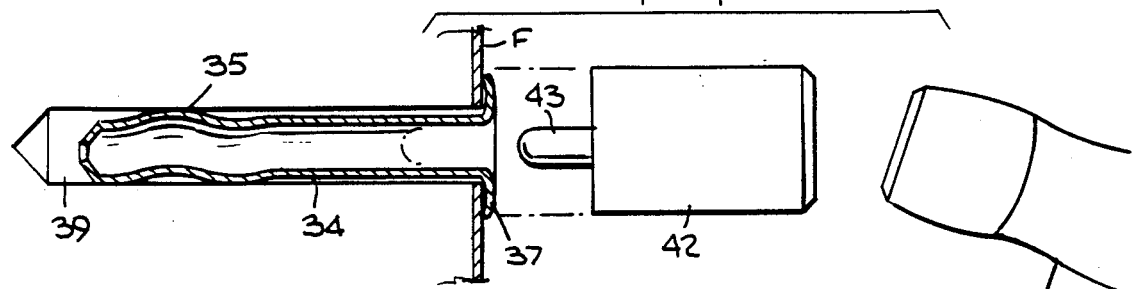
FIG. 13 illustrates a setting tool for driving a tubular anchor in place.

The hollow anchors shown in FIGS. 9 to 12 do not have heads as in a solid metal anchor shown in FIG. 1, but a relatively thin collar or flange 37. In order, therefore, to facilitate driving these hollow anchors into hole 39 drilled in masonry or a substrate, a setting tool 42 is provided. This is formed by a solid cylindrical block of steel whose upper end forms an anvil which is struck by the hammer H or other tool used by the installer, the lower end having a peg 43 projecting axially therefrom which is received in the hollow of the anchor. Hence it is a simple matter, using this setting tool, to hammer the anchor into the hole, as shown in FIG. 13.

Caps for Hollow Anchors

With hollow, single-piece anchors of the type shown in FIGS. 9 to 12, one practical application therefor is for fastening exterior sheathing to the masonry of a building. After inserting the hollow anchor through a mounting hole in the sheathing and driving the anchor shank into a hole in the masonry, the sheathing is then secured to the masonry, but flange 37 and the hollow of the anchor are exposed.

Normally, in securing metal sheathing to the masonry of a building, use is made for this purpose of pre-colored, self-tapping concrete screws, a like-colored washer also being provided. These screws and washers are presently used in building construction in huge volumes. It is necessary, therefore, for a builder to keep in stock painted screws and washers in a range of colors to match different colored sheathing.

But while with driven-in hollow anchors in accordance with the invention it is much easier to secure metal sheathing to masonry or other structural material, these anchors cannot be pre-painted, for the paint would be chipped by the hammering action. We have therefore provided means to impart any desired color to the anchor after it is driven in, the anchor itself being of unpainted metal.

Figure 14:
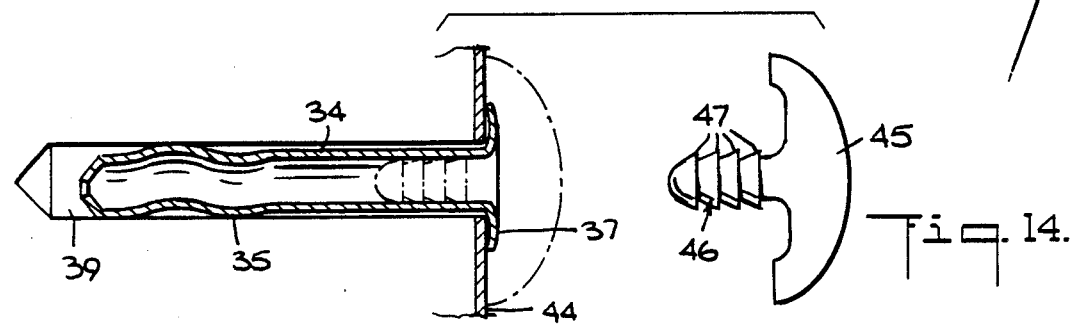
FIG. 14 illustrates a press-on plastic cap for an installed tubular anchor.

With a hollow wall anchor in accordance with the invention as shown in FIG. 14, when the anchor is driven, this flange 37 rests against the surface of sheathing 44 and is exposed. To cover the flange, a colored, dome-shaped plastic button or cap 45 is provided having a center plug 46 formed with a series of compressible cones 47. Hence when plug 46 is pressed into the hollow of the anchor, it is frictionally retained therein, and the press-on cap 45 then covers flange 37 of the anchor. The color of the cap matches that of sheathing 44. With this arrangement, the hollow anchors need have no color added thereto, for the color necessary to match the sheathing is supplied by the cap pressed onto the installed anchor.

Figure 15:
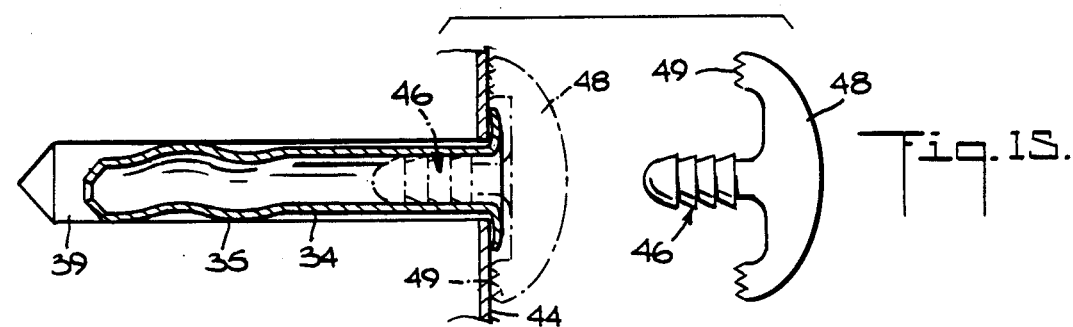
FIG. 15 illustrates a press-on cap having sealing rings.

In the press-on cap shown in FIG. 15, cap 48 is made of rubber or other elastomeric material having the desired matching color for the sheathing. The underside of cap 48 is provided with concentric sealing rings 49 that when pressed against the surface of the sheathing act to render the fastening waterproof.

Figure 16:
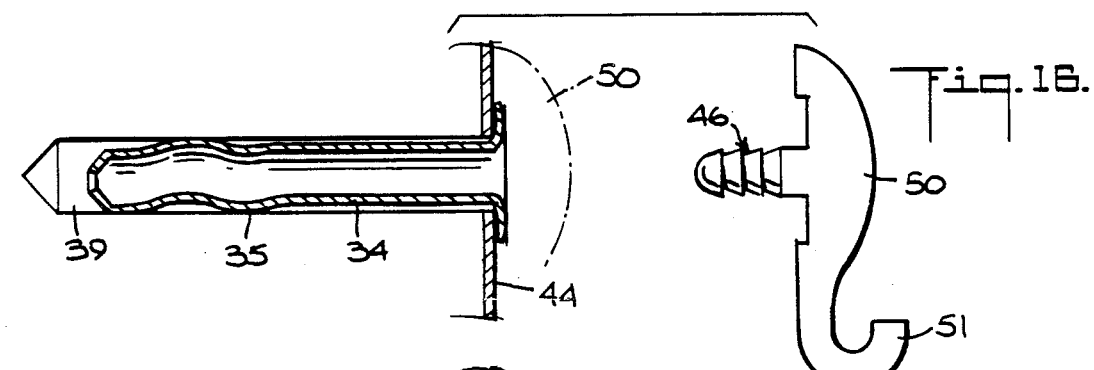
FIG. 16 illustrates a press-on cap provided with a hook.

In the version of the press-on plastic cap 50 shown in FIG. 16, which includes a center plug 46 for insertion in the hollow of the anchor, the cap is so molded as to create a hook extension 51, so that it can be used to support relatively light loads. Thus there may be festive occasions when one wishes to festoon or otherwise decorate the exterior sheathing of the building, and the hooked caps are useful for this purpose.

Figure 17:
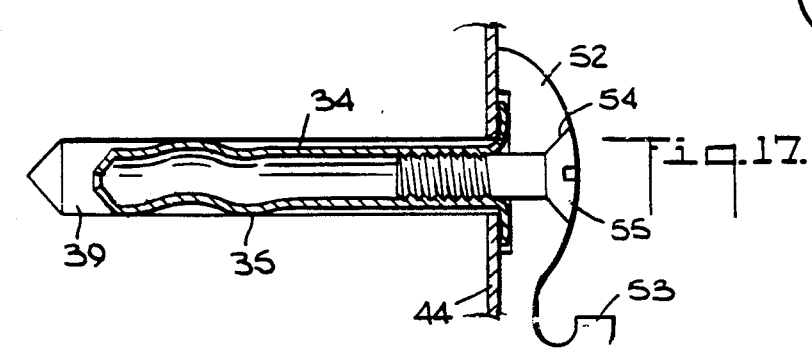
FIG. 17 illustrates a screw-on plastic cap for a tubular anchor.

In the plastic cap 52 shown in FIG. 17 which includes a hook 53, in order to make it possible for this hook to support heavier loads, the cap is provided with a countersunk center hole 54 to receive a machine screw 55 which is turned into the internally-threaded shank of a hollow anchor of the type shown in FIG. 11.

Sleeves for Single-Piece Anchors

Single piece anchors of the solid or hollow type as disclosed hereinabove are often not effective in very weak, porous or brittle concrete or masonry having a hole drilled therein to receive the anchor. The reason for this is that when driving in the anchor, the bend in the shank, instead of being deformed to fit into the hole, will instead chisel its way into the weak wall of the hole. As a consequence, the anchor will have little holding power.

In order to overcome this problem, use is made, as shown in FIG. 18, of a thin wall sleeve 56 preferably formed of synthetic plastic material or steel. The sleeve is provided at its lower end with an array of longitudinal slits to define deflectable fingers 56F.

If, therefore, as shown in FIG. 19, one wishes to drive a hollow or solid type of single-piece, pre-shaped anchor 58 in accordance with the invention into a hole 59 drilled in a weak masonry 57, before doing so, one first inserts sleeve 56 into the hole to protectively line the hole wall. Then when the anchor shank is driven into the lined hole as shown in FIG. 20, the bend therein causes fingers 56F to deflect outwardly to become impressed into the wall of the hole, the bend being deformed to exert a holding force on the hole wall. In this way, chiseling or mutilation of the masonry hole is avoided.

Instead of a split sleeve, one may use a thin wall sleeve 61, as shown in FIGS. 21 and 22, provided with a series of spaced exterior ribs, projections, tabs, or annular rings 61. These are forced outwardly into the masonry by the driven-in shank 58 of the anchor.

The sleeves shown in FIGS. 18 to 20 have no collar or flange at their upper end, as a result of which they are brought to rest on the bottom of the hole wall and cannot be pushed beyond this point by the shank of the driven-in anchor. But where the substrate or masonry body is of limited thickness, as in the hollow concrete wall 62 shown in FIGS. 21 and 22, in order to prevent the sleeve from being pushed behind this wall, it is provided at its upper end with a flared collar or flange 63. This acts to prevent the sleeve from going forward when the anchor is driven into the hole.

It is important to understand that while a single-piece, pre-shaped anchor in accordance with the invention is especially useful in masonry, weak or otherwise, it is an all purpose and can go into any hole in structural material capable of withstanding the lateral force exerted by the resilient undulation in the shank as the anchor is driven into the hole.

While there have been shown and described preferred embodiments of single-piece, pre-shaped anchors in accordance with the invention, it will be appreciated that many changes and modifications may be made therein without, however, departing from the essential spirit thereof.

I claim:

1. A pre-shaped anchor of a kind adapted to be forcibly driven axially into a tightly fitting hole drilled in masonry, so that the anchor makes a strong interference fit therein, said anchor being adapted to support an object at a position adjacent said masonry, said masonry being of a material which if scored, chiseled or otherwise mutilated by the anchor would alter the shape of the hole wall and thereby weaken the holding power of the anchor; said anchor comprising a drivable element and an elongated shank extending from the element and terminating in a tip, said shank being pre-shaped to have an end portion furthest from the element which extends in the general direction of the longitudinal axis passing through the element and said tip of the shank and to have at least one undulation between the element and said end portion which creates a bend in the shank having a peak on one side of the shank between base portions generally on the other side of said shank, said shank being formed of resilient material and having a non-abrading bearing surface, so that when it is forcibly driven into said tightly fitting hole it will not score, chisel or otherwise mutilate the hole wall, and said undulation will be forcibly altered by reaction with the wall of the hole, and in seeking to recover its original shape, will frictionally secure the anchor in place.

2. An anchor as set forth in claim 1, wherein said shank has a maximum cross-sectional dimension which is not substantially greater than the diameter of the hole.

3. An anchor as set forth in claim 1, wherein said element is a head engageable by a hammer.

4. An anchor as set forth in claim 1, wherein said element is an externally threaded stud.

5. An anchor as set forth in claim 1, wherein said element is in a hook formation.

6. An anchor as set forth in claim 1, wherein said element is in a loop formation.

7. A protective liner for an anchor as set forth in claim 1, said liner being in the form of a thin-walled sleeve that is insertable into the hole to protect the wall thereof.

8. A liner as set forth in claim 7, wherein the lower portion thereof is slotted to form deflectable fingers.

9. A liner as set forth in claim 7, wherein said sleeve is provided on its exterior with a series of annular rings.

10. A liner as set forth in claim 7, wherein said sleeve is provided at its upper end with a flared collar.

11. An anchor as set forth in claim 1, further including a security element formed at the junction of the drivable element and the shank and dimensioned to at least fill the mouth of the hole when the shank is driven into the hole, thereby to prevent wiggling and loosening of the shank as a result of lateral vibratory forces imposed on the anchor.

12. An anchor as set forth in claim 11, wherein said security element has a diameter somewhat greater than that of the hole whereby the security element when the shank is driven into the hole jams into and becomes wedged in the mouth of the hole.

13. An anchor as set forth in claim 12, wherein said security element is generally cylindrical and has a slight taper to facilitate its entry into the mouth of the hole.

14. A one-piece, pre-shaped anchor of a kind adapted to be forcibly driven axially into a tightly fitting hole so that the anchor makes a storing interference fit therein; said anchor comprising a drivable element and an elongated shank, said shank being pre-shaped to have an end portion furthest from the element which extends in the direction of the longitudinal axis passing through the element and shank and to have at least one undulation between the element and said end portion which creates a bend in the shank having a peak on one side of the shank between spaced apart base portions generally on the other side of said shank, said shank being formed of resilient material so that when it is forcibly driven into said tightly fitting hole, said undulation will be forcibly altered by reaction with the wall of the hole, and in seeking to recover its original shape, will secure the anchor in place, said anchor being formed of tubular material whose upper end is enlarged to create said element, the shank and the bend therein being hollow.

15. An anchor as set forth in claim 14, wherein said tubular material is a steel tube.

16. An anchor as set forth in claim 14, wherein said tubular material is a stamped metal sheet bent into a tubular form.

17. An anchor as set forth in claim 14, wherein the portion of the shank below said flared element is of uniform diameter and is internally threaded to receive a machine screw;.

18. An anchor as set forth in claim 14, wherein said shank has an open tip.

19. An anchor as set forth in claim 14, wherein said shank has a closed tip.

20. A setting tool for a hollow anchor as set forth in claim 14, said tool being constituted by a cylindrical block having an anvil at one end and a peg projecting from the other end which is received in the hollow shank.

21. A press-on cap for a hollow anchor as set forth in claim 14, said cap having a center plug that is frictionally received in the hollow shank.

22. A press-on cap as set forth in claim 21, formed of elastomeric material and having concentric rings on its underside to effect a waterproof seal.

23. A press-on cap as set forth in claim 21, said cap having a hook formation.

24. A screw-on cap for a hollow anchor as set forth in claim 21, said cap having a center hole therein to accommodate a holding machine screw that turns into the internally threaded portion of the shank.

25. A pre-shaped anchor of a kind adapted to be forcibly driven axially into a tightly fitting hole drilled in masonry, so that the anchor makes a strong interference fit therein, said masonry being of a material which if scored, chiseled or otherwise mutilated by the anchor would alter the shape of the hole wall and thereby weaken the holding power of the anchor; said anchor comprising a drivable element and an elongated pre-shaped shank formed of resilient material having a non-abrading bearing surface and having a cross-sectional dimension which at no point therealong substantially exceeds that of the drilled hole, said pre-shaped shank having a first portion extending from the element in the direction of a longitudinal axis passing through the element and a second portion extending from the first portion and displaced from said longitudinal axis, so that when the shank is forcibly driven into said tightly fitting hole it will not score, chisel or otherwise mutilate the hole wall, and said second portion will be forcibly altered by reaction with the wall of the hole to bring it toward alignment with said longitudinal axis and thereby frictionally secure the anchor in place.

* * * * *